April 23, 1929. W. MARSHALL ET AL 1,710,230
VEHICLE BODY CONSTRUCTION
Filed Aug. 25, 1924    2 Sheets-Sheet 1
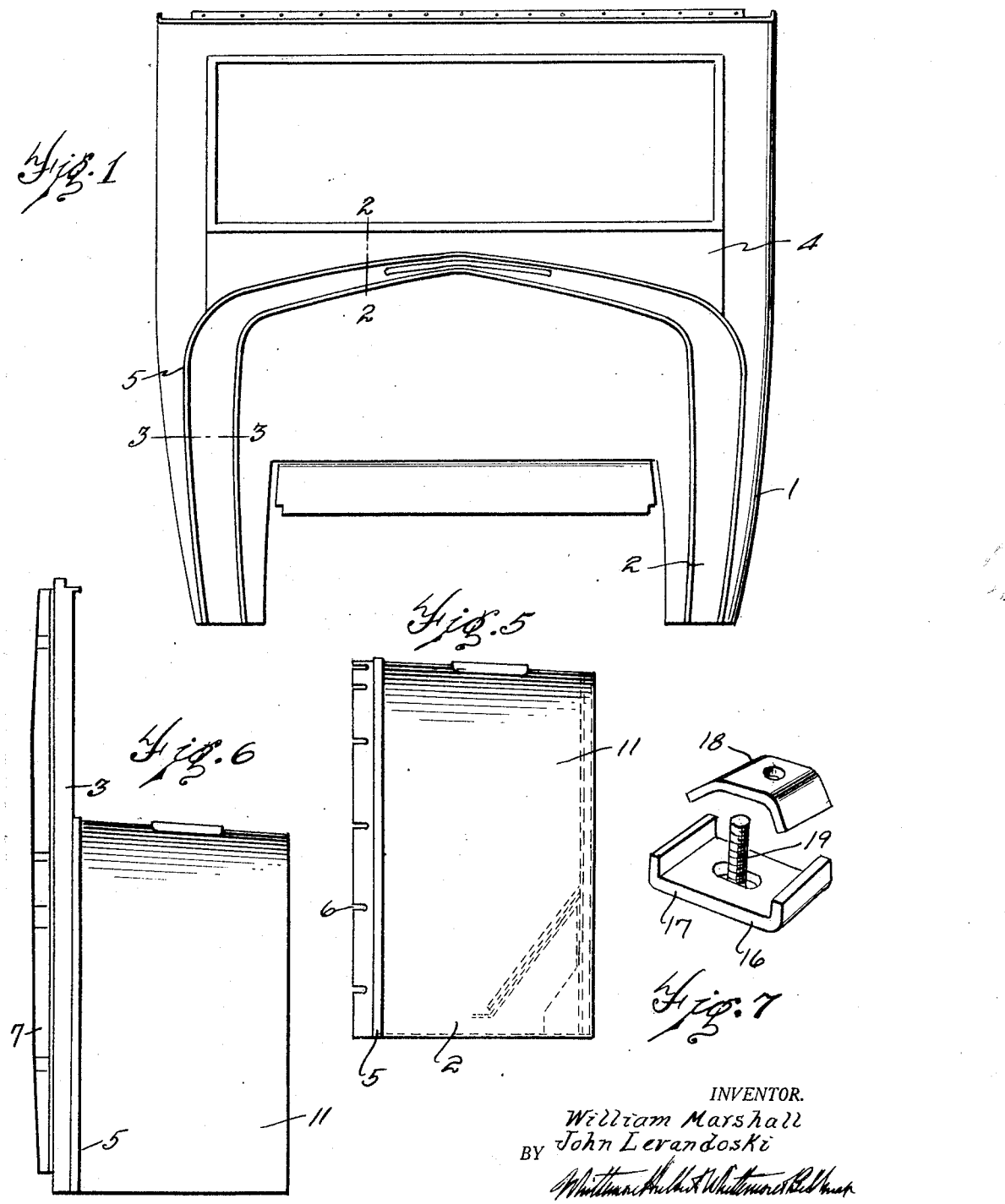
INVENTOR.
William Marshall
John Lerandoski
BY
ATTORNEYS

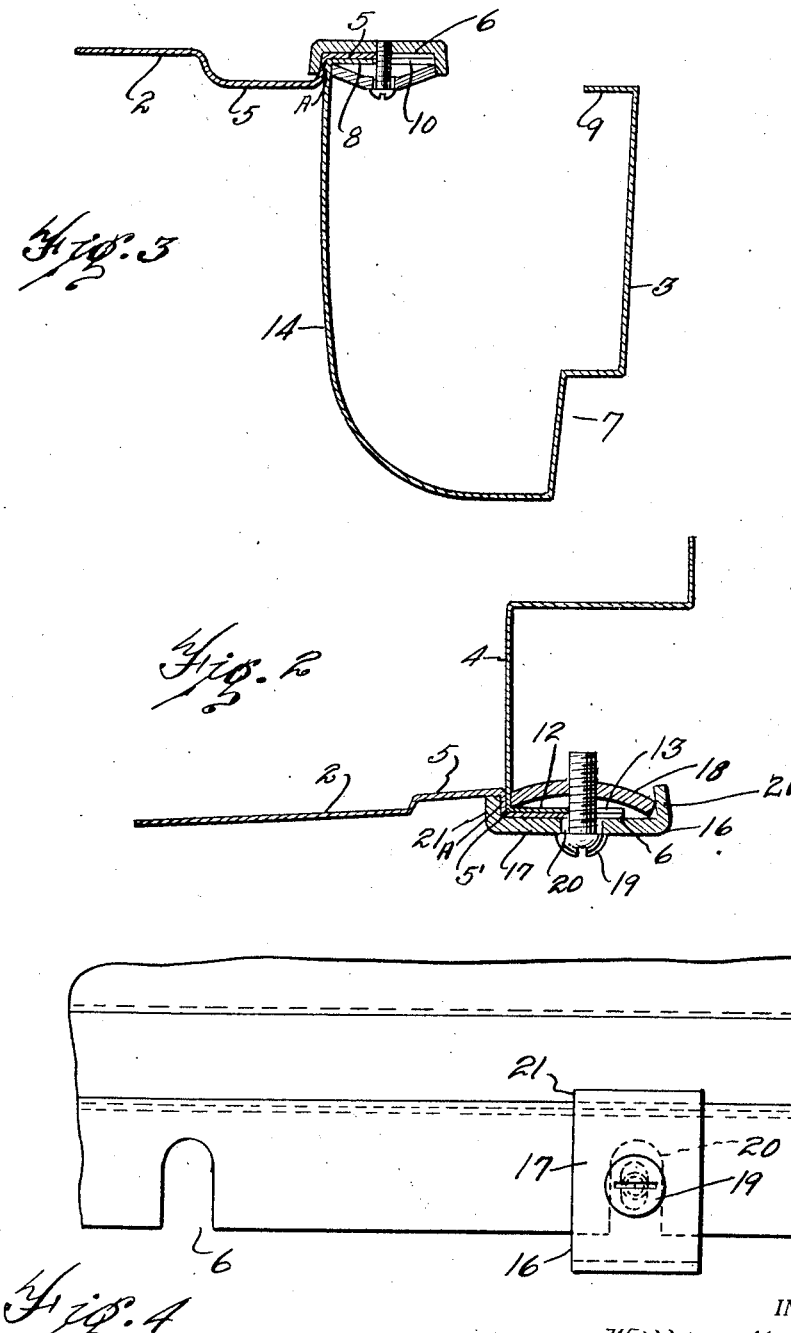

Patented Apr. 23, 1929.

1,710,230

UNITED STATES PATENT OFFICE.

WILLIAM MARSHALL AND JOHN LEVANDOSKI, OF DETROIT, MICHIGAN, ASSIGNORS TO BRIGGS MANUFACTURING COMPANY, OF DETROIT, MICHIGAN, A CORPORATION OF MICHIGAN.

VEHICLE BODY CONSTRUCTION.

Application filed August 25, 1924. Serial No. 734,073.

This invention relates generally to vehicle bodies and refers more particularly to the method of assembling and the means for securing the cowl to the front pillars and intermediate belt panel of such bodies.

One of the essential objects of the invention is to provide a body construction in which the cowl, pillars and belt panel are preferably prefashioned so that they may be easily and quickly assembled and may be readily connected rigidly together by means of a simple form of clip.

Another object is to provide a strong and durable clip that can be manufactured at a comparatively low cost.

With the above and other objects in view the invention consists of certain novel features of construction, combinations and arrangement of parts as will be more fully described and particularly pointed out in the appended claims.

In the accompanying drawings;—

Figure 1 is a front elevation of a vehicle body embodying my invention;

Figure 2 is a sectional view taken on the line 2—2 of Figure 1;

Figure 3 is a sectional view taken on the line 3—3 of Figure 1;

Figure 4 is a fragmentary bottom plan view of the construction shown in Figure 2;

Figure 5 is a side elevation of the cowl before being attached to the belt panel and pillars;

Figure 6 is a side elevation of the cowl and one of the pillars when assembled together;

Figure 7 is a perspective view of one of the clips used for connecting the parts together.

Referring now to the drawings in which like characters of reference designate corresponding parts throughout the several views, the numeral 1 designates a vehicle body, preferably of the closed type, having a cowl 2, and cooperating frame members such as the front pillars 3 and a transversely extending belt panel 4. To facilitate the assembly of these parts they are preferably prefashioned. As shown, the cowl 2 is preferably provided adjacent to the inner end thereof with a transversely extending upwardly embossed portion 5 so that a rabbet A is provided for receiving portions of the frame members 3 and 4. As shown, the base 5′ of this rabbet is also provided with a series of spaced elongated slots 6 that extend forwardly from the inner end thereof to points adjacent to the inner edge of the embossed portion 5. The pillars 3 are preferably U-shaped in cross section except for the door abutment shoulders 7 and are provided at their inner edges with the opposed inwardly extending flanges 8 and 9, respectively. As shown, the flanges 8 are preferably equal in width to the distance between the inner end of the cowl and the inner edge of the embossed portion 5 and have a series of spaced slots 10 therein that are adapted to register with the slots 6 in the depending sides 11 of the cowl. The belt panel 4 preferably extends between the pillars 3 above the cowl 2 and is preferably provided at its lower edge with a rearwardly extending flange 12. This flange is preferably equal in length to the distance between the inner end of the cowl and the inner edge of the embossed portion 5 and is provided with a series of spaced slots 13 that are adapted to register with the slot 6 in the curved portion of the cowl.

To assemble the parts, the flanges 8 of the pillars are placed against the depending sides 11 of the cowl so that the forward sides 14 of the pillars abut the rear edges of the embossed portion 5 and the slots 10 register with the adjacent slots 6 as shown in Figure 3 of the drawings, whereupon the flange 12 of the belt panel is placed on the curved portion of the cowl so that the front face of the panel abuts the rear edge of the embossed portion 5 and the slots 13 register with the adjacent slots 6, as shown in Figure 2 of the drawings.

For rigidly holding the parts in assembled position, we preferably provide a series of clips 16 having cooperating plates 17 and 18 that are adapted to be adjusted by suitable bolts 19 to clamp the belt panel 4 and pillars 3 against the embossed portion 5 of the cowl 2. As shown, each plate 17 has a central elongated opening 20 and the parallel flanges 21 at the opposite ends thereof, while each plate 18 is preferably longitudinally curved and is provided with a central threaded opening 22.

Before applying the clips 16 to the cowl, pillars and belt panel of the vehicle body, the plates 17 and 18 are preferably loosely connected by the bolts 19 as shown in Figure 7 of the drawings. To apply the clips, the bolts 19 are slipped into the registering slots 6 and 10 respectively and 6 and 13 respectively so that the outer flanges 21 of the plates 17 may be engaged with the inner wall 22 of the embossed portion 5 of the cowl, whereupon the bolts 19 may be adjusted to clamp the plates of the clips in position. When the bolts are adjusted as described, the curved plates 18 will be flattened so that the opposite ends thereof will be extended toward the flanges 21 at the opposite ends of the plates 17, consequently, the inner flanges 21 will form stops for abutments for the inner ends of the plates 18, while the outer flanges 21 will cooperate with the forward ends of the plates 18 to firmly clamp the forward sides 14 of the pillars and the belt panel against the embossed portion 5 of the cowl.

While it is believed that from the foregoing description the nature and advantages of the invention will be readily apparent, we desire to have it understood that we do not limit ourselves to what is herein shown and described, and that such changes may be resorted to when desired as fall within the scope of what is claimed.

What we claim as our invention is:

1. In combination, a cowl having a transversely extending L-shaped rabbet at the rear end thereof, a frame member having an upright wall seated against the upright wall of said rabbet and having a lateral flange seated against the base of the rabbet, means for rigidly holding the frame member and cowl in assembled position including a channel-shaped member receiving the base of the rabbet between the flanges of the channel, a bowed member extending between the upright wall aforesaid of said frame member and one of the flanges of the channel member, and means for flattening the bowed member toward the base of the channel member to clamp the vertical walls of said frame member and rabbet together between one end of the bowed member and a flange of the channel member, said means comprising a bolt extending freely through the base of the channel member and threadedly engaging the bowed member.

2. In combination, a cowl having a transversely extending L-shaped rabbet at the rear end thereof, a frame member having an upright wall seated against the upright wall of said rabbet and having a lateral flange seated against the base of the rabbet, the base of said rabbet and the lateral flange of said frame member having registering slots therein, means for rigidly holding the frame member and cowl in assembled position including a channel-shaped member receiving the base of the rabbet between the flanges of the channel, a bowed member extending between the upright wall aforesaid of said frame member and one of the flanges of the channel member, and means for flattening the bowed member toward the base of the channel member to clamp the vertical walls of said frame member and rabbet together between one end of the bowed member and a flange of the channel member, said means including a headed element extending through the registering slots in the base of said rabbet and lateral flange of said frame member and registering openings in said channel member and bowed member.

In testimony whereof we affix our signatures.

WILLIAM MARSHALL.
JOHN LEVANDOSKI.

CERTIFICATE OF CORRECTION.

Patent No. 1,710,230. Granted April 23, 1929, to

WILLIAM MARSHALL ET AL.

It is hereby certified that error appears in the above numbered patent requiring correction as follows: In the drawings, sheet 2, in Figure 3 the bolt should be inverted so as to pass loosely through the upper plate and engage threads in the curved plate.

In Figure 2, the threads in the curved plate 18 should be identified by the numeral 22, and the character A should be 22 prime. In sheet 1, Figure 7 the opening in the plate 18 should be identified by the numeral 22, the slot in plate 16 should be identified by the numeral 20, and the upstanding flange on the plate 16 should be identified by the numeral 21.

In the printed specification page 2, line 3, for "22" read "22 prime"; and that the said Letters Patent should be read with these corrections therein that the same may conform to the record of the case in the Patent Office.

Signed and sealed this 2nd day of July, A. D. 1929.

M. J. Moore,
Acting Commissioner of Patents.

(Seal)